(12) United States Patent
Hull et al.

(10) Patent No.: US 7,353,961 B2
(45) Date of Patent: *Apr. 8, 2008

(54) OUTLET BOX KNOCKOUT

(75) Inventors: Eric G. Hull, Madison, OH (US); Gregory D. Turcovsky, Mentor, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 514 days.

This patent is subject to a terminal disclaimer.

(21) Appl. No.: 10/680,798

(22) Filed: Oct. 7, 2003

(65) Prior Publication Data

US 2005/0072778 A1   Apr. 7, 2005

(51) Int. Cl.
*H02G 3/08* (2006.01)
*H02G 3/18* (2006.01)
*B65D 6/40* (2006.01)

(52) U.S. Cl. ............... 220/3.2; 220/254.1; 220/266; 220/277; 220/284; 220/661; 174/666

(58) Field of Classification Search ......... 220/839, 220/3.2–3.9, 3.92, 3.94, 4.02, 274, 266, 269, 220/277, 287, 661, 254.1; 174/666
See application file for complete search history.

(56) References Cited

U.S. PATENT DOCUMENTS

| | | | |
|---|---|---|---|
| 2,154,310 A | 4/1939 | Kinnard | |
| 2,240,187 A | 4/1941 | Kingdon et al. | |
| 4,189,964 A | 2/1980 | Gray | |
| 4,320,850 A * | 3/1982 | Drolen, Jr. ............... | 220/269 |
| 4,640,433 A | 2/1987 | Jorgensen et al. | |
| 4,675,782 A | 6/1987 | Hibbert et al. | |
| 4,688,146 A | 8/1987 | Newmark et al. | |
| 4,716,496 A | 12/1987 | Fritsch | |
| 4,750,411 A | 6/1988 | Eversole | |
| 4,805,920 A * | 2/1989 | Gavin ...................... | 277/606 |
| 5,043,536 A | 8/1991 | DeBartolo, Jr. | |
| 5,148,348 A | 9/1992 | White | |
| 5,191,171 A | 3/1993 | Bordwell | |
| 5,286,040 A * | 2/1994 | Gavin ...................... | 277/606 |
| 5,444,183 A | 8/1995 | Gehrs et al. | |
| 5,704,578 A | 1/1998 | Fischer | |
| 5,728,973 A | 3/1998 | Jorgensen | |
| 5,769,659 A | 6/1998 | Ceylan | |
| 5,804,764 A | 9/1998 | Gretz | |
| 5,906,508 A | 5/1999 | Jeffcoat | |
| 5,950,277 A | 9/1999 | Tallmadge et al. | |
| 5,959,250 A | 9/1999 | Daoud | |
| 6,031,182 A | 2/2000 | Daoud | |
| 6,103,973 A | 8/2000 | Sharp | |
| 6,125,881 A | 10/2000 | Hobbs et al. | |
| 6,239,368 B1 * | 5/2001 | Gretz ...................... | 174/57 |

(Continued)

*Primary Examiner*—Anthony D. Stashick
*Assistant Examiner*—Niki M. Eloshway
(74) *Attorney, Agent, or Firm*—Jones Day

(57) ABSTRACT

An electrical outlet box molded of plastic material has a knockout arrangement in a box wall that is formed by inner, intermediate and outer circular grooves that are eccentrically positioned to overlap at a tangent location and define inner, intermediate and outer eccentrically positioned circular knockouts. The grooves vary in depth from a minimum depth at the tangent location to a maximum depth opposite from the tangent location. Areas of increased weakness are provided in the box wall at the bottoms of at least the inner and intermediate grooves, and screwdriver slots are provided in the knockouts opposite from the tangent location.

35 Claims, 3 Drawing Sheets

U.S. PATENT DOCUMENTS

| | | |
|---|---|---|
| 6,242,697 B1 | 6/2001 | Gerken et al. |
| 6,264,056 B1 | 7/2001 | King |
| 6,441,307 B1 | 8/2002 | Shotey et al. |
| 6,672,389 B1* | 1/2004 | Hinrichs ............... 166/317 |
| 6,765,147 B1* | 7/2004 | Weiss et al. ............ 174/60 |
| 6,812,405 B1* | 11/2004 | Hull et al. ............. 174/58 |
| 6,870,101 B1* | 3/2005 | Hull et al. ............. 174/58 |
| 6,914,187 B2* | 7/2005 | Hull et al. ............. 174/50 |
| 6,940,017 B2* | 9/2005 | Roesch et al. .......... 174/58 |
| 7,109,415 B2* | 9/2006 | Neitzel et al. .......... 174/50 |
| 2002/0060891 A1 | 5/2002 | Buie, Jr. |
| 2002/0066581 A1 | 6/2002 | Bashford |

* cited by examiner

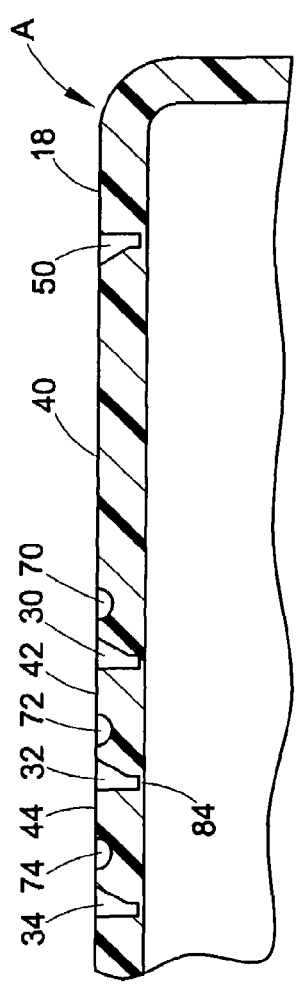
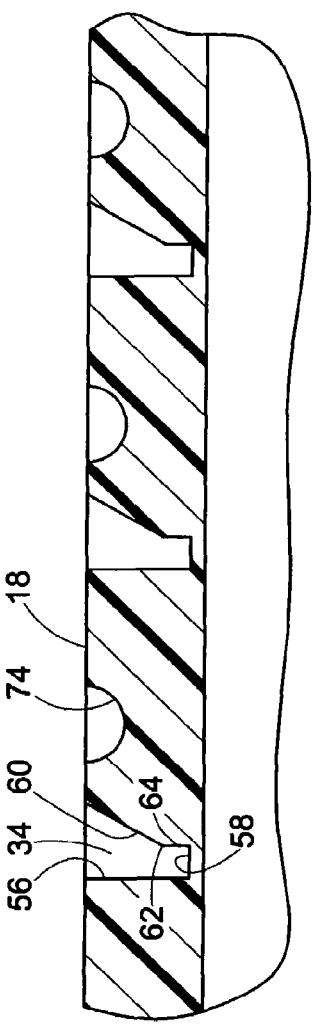
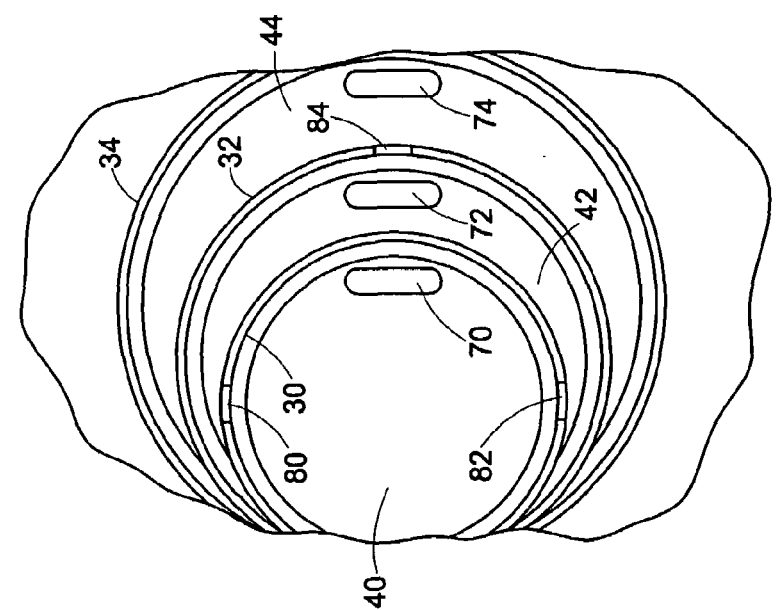

OUTLET BOX KNOCKOUT

BACKGROUND OF THE INVENTION

This application relates to electrical outlet boxes that are molded of plastic material and have knockouts molded into the box walls. However, it will be appreciated that the invention has broader aspects, and that the knockout arrangement of the present application can be used in other types of housings and enclosures.

It is common to mold knockouts in the walls of electrical boxes to provide openings for attaching conduits and fittings to the box. It is difficult to mold the knockouts in a manner that provides easy removal of a desired knockout without dislodging other knockouts. It also is difficult to provide an arrangement for molding the knockouts into the box walls while ensuring plastic flow to the knockout areas during the molding process.

SUMMARY OF THE INVENTION

A knockout arrangement in a plastic wall includes inner, intermediate and outer circular grooves that are eccentric relative to one another and overlap at a tangent location. All three of the grooves have a common minimum depth at the tangent location and a common maximum depth opposite from the tangent location.

The grooves circumscribe inner, intermediate and outer knockouts that have slots opposite from the tangent location for receiving the tip of a flat blade screwdriver to facilitate removal of the knockouts.

Weakened areas are provided in the box wall at the bottom of the inner and intermediate grooves so that removal of the inner knockout will not result in removal of the intermediate or outer knockouts, and so that removal of both the inner and intermediate knockouts will not result in removal of the outer knockout.

The minimum groove depth at the tangent location provides a path for flow of plastic across the grooves to fill the mold cavity in the area of all of the knockouts.

It is a principal object of the invention to provide an improved knockout arrangement.

It is another object of the invention to provide a knockout arrangement that provides easy knockout removal while minimizing the possibility that other knockouts will be undesirably displaced.

BRIEF DESCRIPTION OF THE DRAWING

FIG. 4 is a partial cross-sectional elevational view taken generally on line 4-4 of FIG. 3;

FIG. 5 is an enlarged partial cross-sectional elevational view showing the shape of the grooves that are molded into the box walls; and FIG. 6 is a partial plan view of a knockout arrangement showing the weakened areas in the grooves for the small and intermediate knockouts.

DESCRIPTION OF A PREFERRED EMBODIMENT

Figure 1:
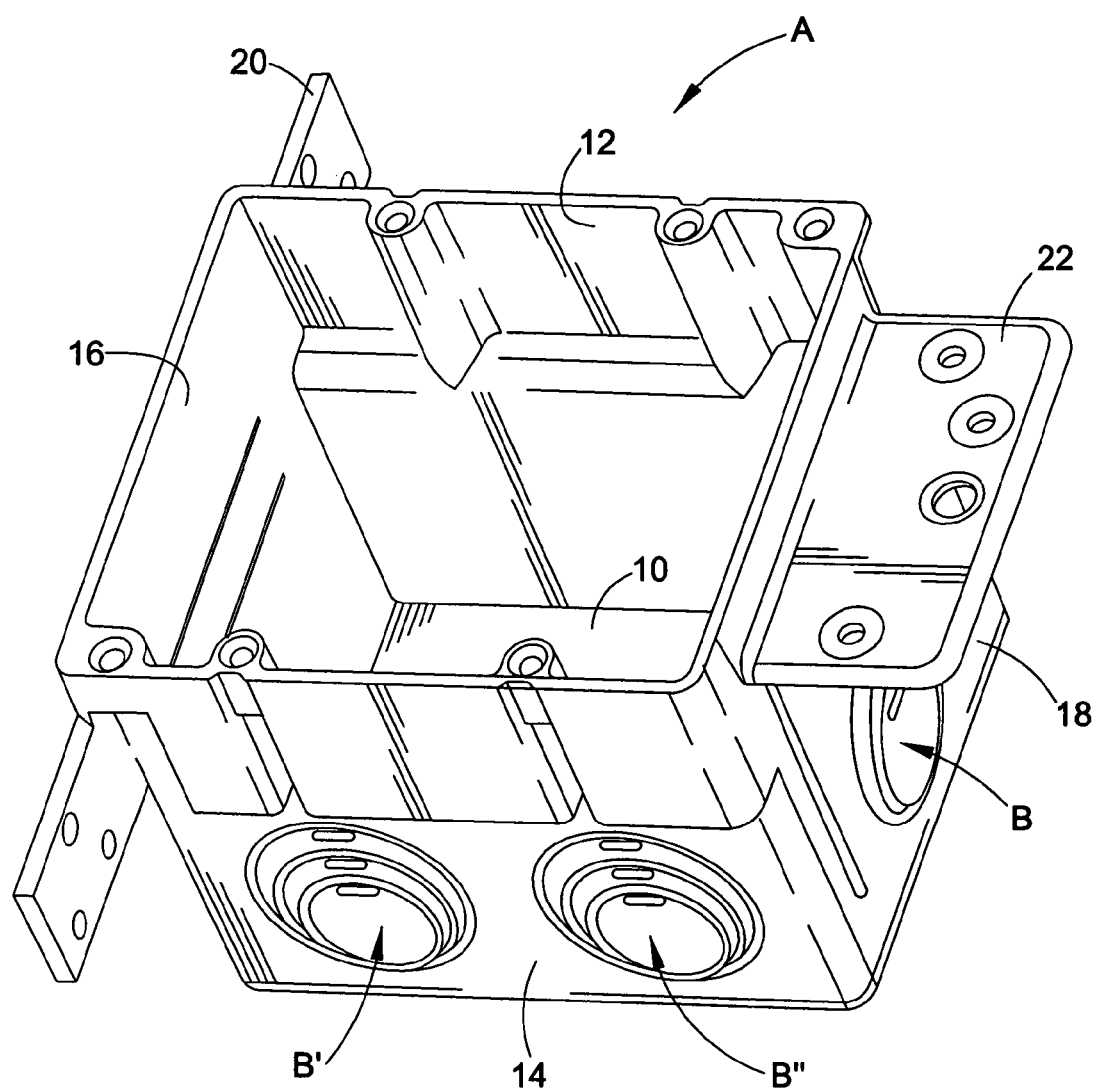
FIG. 1 is a perspective illustration of a molded plastic box having the knockout arrangement of the present application incorporated therein.

Referring now to the drawing, wherein the showings are for purposes of illustrating a preferred embodiment of the invention only and not for purposes of limiting same, FIG. 1 shows an electrical outlet box molded of plastic material such as, but not necessarily limited to, PVC or polycarbonate. Box A has a bottom wall 10, opposite side walls 12, 14 and opposite end walls 16, 18. Box A has an open front end opposite from bottom wall 10. Although a two gang box is illustrated in the drawings, it will be appreciated that the invention can be used with single gang boxes as well as with boxes, enclosures and housings of many other types. Box A has mounting flanges 20, 22 for attaching same to wall studs or to joists.

Figure 3:
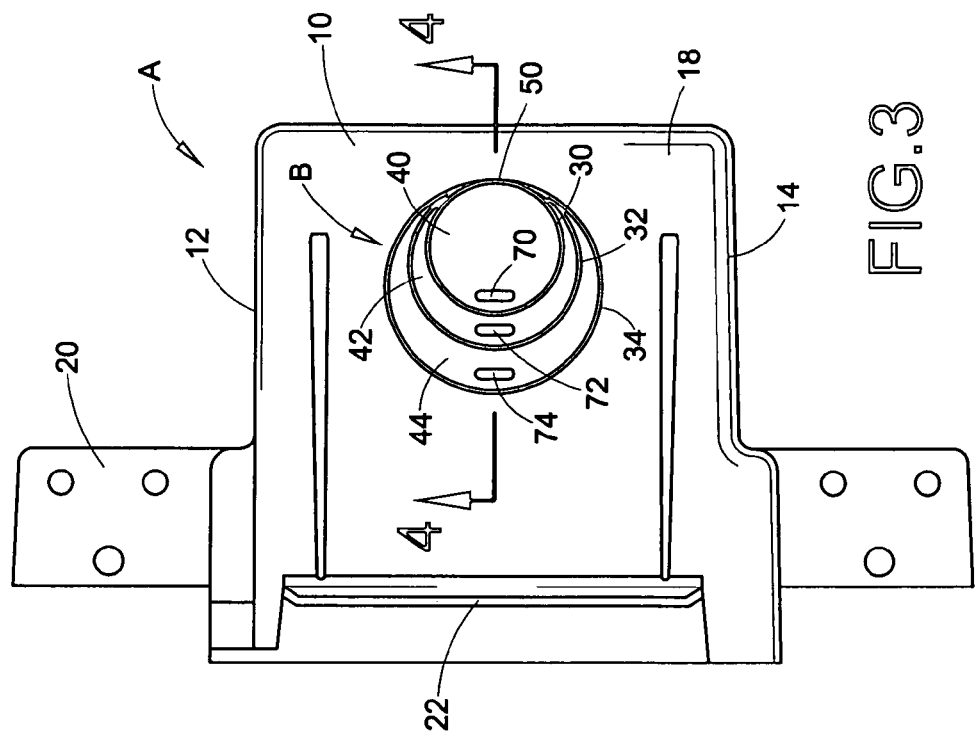
FIG. 3 is an end elevational view thereof.
Figure 2:
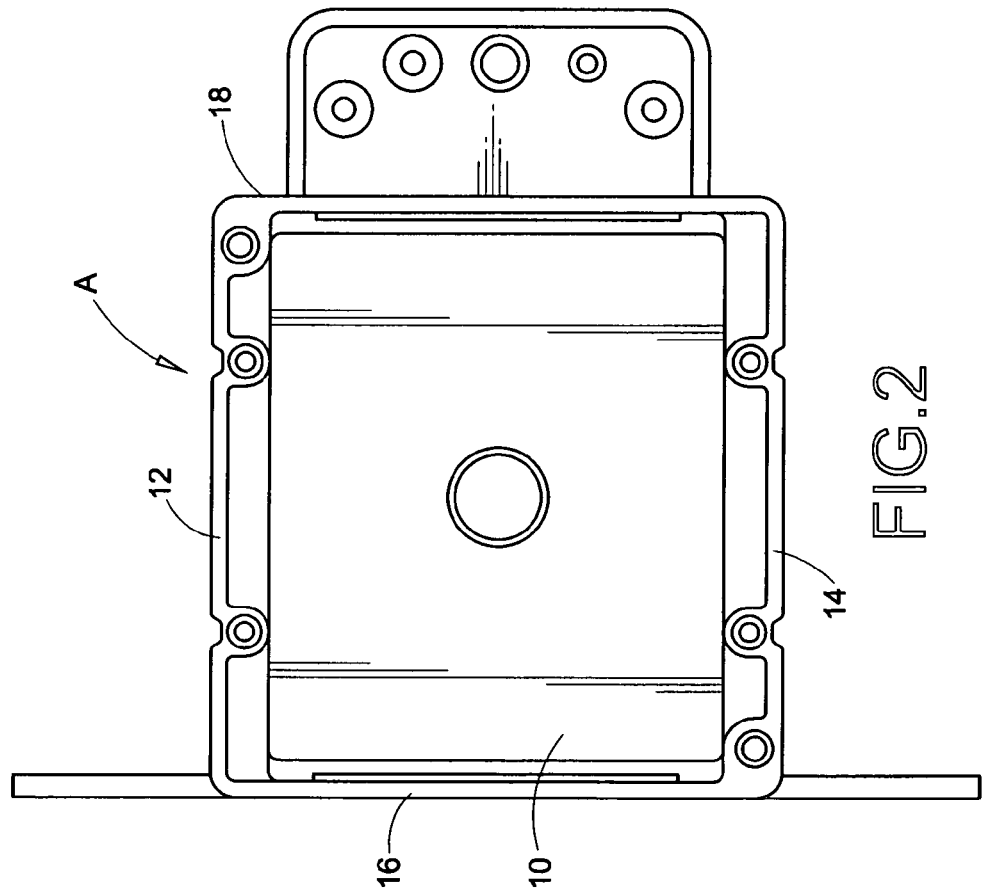
FIG. 2 is a plan view of the box looking at its open end.

FIG. 3 shows a knockout arrangement B that is molded into wall 18. It will be recognized that the knockout arrangement of the present application may be provided in one or more of the box walls and that some box walls may have more than one knockout arrangement. For example, two knockout arrangements, B' and B" are shown in box wall 14 in FIG. 1.

Knockout arrangement B is formed by molding inner, intermediate and outer circular grooves 30, 32 and 34 into the exterior surface of box wall 18. The circular grooves define inner, intermediate and outer circular knockouts 40, 42 and 44. The knockouts and grooves are eccentrically positioned relative to one another and overlap at a tangent location 50. Intermediate groove 32 surrounds inner groove 30 except along tangent location 50, and outer groove 34 surrounds intermediate groove 32 except along the tangent location 50. The three grooves overlap one another over around 45° of inner groove 30, and over smaller arcs of intermediate and outer grooves 32, 34 so that the tangent location is actually an arcuate overlap. The knockouts are oriented such that tangent location 50 is adjacent box bottom wall 10.

The openings formed by removal of the knockouts usually are seven-eighths inch for inner knockout 40, one and one-eighth inch for intermediate knockout 42, and one and three-eighths inch for outer knockout 44. Removal of a knockout provides a circular hole in the box wall for attaching conduits or fittings thereto. The circular holes receive one-half inch, three-fourths inch and one inch trade size conduit or fittings.

All of grooves 30, 32 and 34 have a common minimum depth where they overlap one another at tangent location 50. All three of the grooves have a common maximum depth at a maximum depth location that is opposite from tangent location 50. By way of example, box wall 18 may have a nominal thickness of about 0.092 inch. The depth of the grooves at tangent location 50 then is about 0.075 inch and the maximum depth of all of the grooves generally opposite from tangent location 50 is the same at about 0.082 inch. Thus, the remaining wall thickness between the groove bottoms and the inner surface of wall 18 at tangent location 50 is about 0.017 inch and the remaining wall thickness at the maximum groove depth location is about 0.010 inch. The depth of the grooves gradually increases along an inclined arcuate path from minimum depth tangent location 50 to the opposite maximum depth locations, and all of the grooves have approximately the same depth.

With reference to FIG. 5, groove 34 has an outer circumferential groove wall 56 that extends generally perpendicular to the flat outer surface of wall 18. Outer groove wall 56 intersects a flat groove bottom wall 58 that extends generally parallel to the flat inner and outer surfaces of wall 18 and has a radial dimension of about 0.025 inch. Groove circumferential inner wall 60 is inclined at an included angle with the vertical of about 30° and does not extend all the way down to groove bottom wall 58. Instead, inclined groove inner side wall 60 has an intersection 62 with a short circumferential inner groove wall 64 extending upwardly from groove bottom wall 58 generally parallel to outer wall 56.

Intersection point 62 preferably is more than half-way from the outer surface of wall 18 toward the inner surface thereof and still more preferably is located about three-fourths of the way from the outer surface of wall 18 toward the inner surface thereof. It will be recognized that flat bottom wall 58 and short perpendicular wall 64 can be eliminated so that groove inclined inner wall 60 would intersect groove outer wall 56. The groove bottoms then would be a relatively sharp intersection between groove walls 56 and 60.

An elongated arcuate slot or recess 70, 72 and 74 is provided in the outer surface of each knockout 40, 42 and 44 adjacent the outer periphery thereof generally opposite from tangent location 50. Each slot or recess 70, 72 and 74 is a shallow depression in the outer surface of each knockout that lies on a chord of each circular knockout. The chord extends generally parallel to box bottom wall 10. Each depression is elongated in a direction between box sidewalls 16, 18, and has a curved bottom as shown in FIG. 4.

Slots or recesses 70, 72 and 74 receive the tip of a flat bladed screwdriver for selectively applying a force on each knockout in a direction toward the inside of the box. The slots or depressions 70, 72 and 74 preferably are shallow and extend less than half-way into the thickness of wall 18.

Areas of increased weakness are provided in wall 18 at the bottom of inner groove 30 and intermediate groove 32. FIG. 6 shows areas of weakness 80, 82 at the bottom of inner groove 30 and area of weakness 84 at the bottom of intermediate groove 32. The areas of weakness may be slots or holes that extend completely through the box wall. However, it will be appreciated that the holes may be at least partly closed by plastic flash during the molding process or may not extend entirely through the wall. Therefore, the areas of weakness may be recesses that extend into the groove bottoms further toward the wall inner surface. The areas of weakness are recesses or holes that are about one-eighth inch long around the circumference of a groove and are formed only through flat groove bottom wall 58, or otherwise have a very narrow radial dimension radially of a knockout so as to be not much more than a slit through the box wall at the bottom of a groove.

The weakened areas either are through holes or slits, or the remaining thickness of plastic that remains is so thin that it is equivalent to a through hole or slit because it provides little or no resistance against removal of a knockout. Thus, the box wall in an area of weakness is completely severed or is substantially severed to the point where the remaining box wall material is so thin that it provides little or no strength.

The areas of increased weakness occupy a very small fraction of the circumference of a groove. By way of example, areas of increased weakness 80, 82 occupy less than 10% of the total circumference of inner groove 30. In general, the areas of increased weakness within the inner groove would occupy not more than about 25% of the groove circumference and more preferably not more than about 15% of the groove circumference.

The area of increased weakness within intermediate groove 32 occupies not more than about 5% of the total circumference of intermediate groove 32. In general, the area or areas of increased weakness within the intermediate groove would occupy not more than about 15% of the circumference of the intermediate groove, and more preferably not more than about 10% of the groove circumference. The areas of weakness within the inner groove are a much larger percent of the inner groove circumference than the percent of the intermediate groove circumference occupied by the intermediate groove areas of weakness.

Area of weakness 84 within the intermediate groove is located generally opposite from tangent location 50. Areas of weakness 80, 82 within inner groove 30 are located generally opposite one another approximately midway between tangent location 50 and the opposite maximum depth location. Obviously other locations may be provided, and different numbers or sizes of areas of weakness may be provided.

None of grooves 30, 32 or 34 extend all the way through wall 18 except in the areas of increased weakness 80, 82 and 84 which occupy a very small fraction of a groove circumference and a small fraction of a groove width radially of a knockout so that each area of weakness is like a circumferential line or slit of weakness. Tangent location 50 where all of the grooves overlap one another has a larger remaining wall thickness to enhance flow of plastic to all of the knockout areas during the molding process.

Recesses 70, 72 and 74 are located closely adjacent grooves 30, 32 and 34 at the maximum groove depth locations that are generally opposite or 180° from tangent location 50. Force applied to a knockout with a tool having a tool tip received in a recess 70, 72 or 74 then acts on the weakest area of the wall that remains between the groove bottom and the wall interior surface. This insures that the inner or intermediate knockouts will be severed without displacing the outer knockout, and also facilitates knockout removal.

Although the invention has been shown and described with reference to a preferred embodiment, it is obvious that alterations and modifications will occur to others skilled in the art upon the reading and understanding of this application. Therefore, it is to be understood that the invention may be practiced otherwise than as specifically described herein while remaining within the scope of the claims.

We claim:

1. A wall having at least one knockout arrangement therein, said knockout arrangement comprising eccentrically positioned inner, outer and intermediate knockouts bounded by inner, outer and intermediate circular grooves in said wall, said grooves overlying one another at a tangent location, said grooves having a common first depth greater than zero at said tangent location and a second depth that is greater than said first depth at a location generally opposite from said tangent location.

2. The wall of claim 1 including at least one area of weakness in said wall within said inner groove spaced from said tangent location, the area of weakness providing little or no strength or resistance against removal of the inner knockout compared to the strength or resistance of the wall around the remainder of the bottom of the inner groove.

3. The wall of claim 2 including at least one area of weakness in said wall within said intermediate groove spaced from said tangent location, the area of weakness within the intermediate groove providing little or no strength or resistance against removal of the intermediate knockout compared to the strength and resistance of the wall around the remainder of the bottom of the intermediate groove.

4. The wall of claim 3 wherein said area of weakness in said wall within said intermediate groove is generally opposite from said tangent location.

5. The wall of claim 1 including a pair of generally opposite areas of weakness in said wail within said inner groove spaced from said tangent location, the areas of weakness providing little or no strength or resistance against removal of the inner knockout compared to the strength and resistance of the wall around the remainder of the bottom of the inner groove.

6. The wall of claim 5 including at least one area of weakness in said wall within said intermediate groove spaced from said tangent location, the area of weakness within the intermediate groove providing little or no strength or resistance against removal of the intermediate knockout compared to the strength and resistance of the wall around the remainder of the bottom of the intermediate groove.

7. The wall of claim 1 wherein each of said inner, outer, and intermediate knockouts has a plane outer surface and an outer periphery, and a slot in said outer surface of each of said knockouts adjacent said outer periphery thereof generally opposite from said tangent location for receiving a flat bladed screwdriver tip.

8. The wall of claim 7 wherein each said slot is a shallow depression having a curved bottom.

9. The wall of claim 1 wherein said second depth is the same for all of said grooves and said grooves extend around a full 360 degrees and reduce the thickness of said wall over a full 360 degrees, and the depth of said grooves being less than the thickness of said wall around at least 75% of the circumference thereof.

10. An electrical outlet box of plastic material, said box having a plurality of walls, at least one of said walls having at least one knockout arrangement therein formed by at least one generally circular groove in said one wall, said groove varying in depth between a minimum depth location and a maximum depth location that is generally opposite from said minimum depth location, said groove depth gradually increasing along inclined arcuate paths around the circumference thereof from said minimum depth location to said maximum depth location, said groove extending over a full 360° and reducing the thickness of said wall over a full 360°, said groove having a groove bottom and a predetermined groove depth, said groove bottom being interrupted by at least one area of weakness in said wall within said groove that increases the groove depth and further reduces the strength of said wall in the area of said groove compared to the strength of said wall around the remainder of said groove, and the area of weakness occupying not more than 25% of the groove circumference and providing little or no strength and resistance against removal of the knockout compared to the strength and resistance of the wall around the remainder of the bottom of the groove.

11. The box of claim 10 wherein the difference between said minimum and maximum depth locations is 0.005-0.010 inch.

12. An electrical outlet box of plastic material, said box having a plurality of walls, at least one knockout arrangement in at least one of said walls, said knockout arrangement comprising inner, outer and intermediate generally circular grooves in said wall, said grooves being eccentric with respect to one another and overlapping one another at a tangent location, said grooves varying in depth from a minimum depth at said tangent location to a maximum depth generally opposite from said tangent location, the thickness of the wall being reduced by said grooves including along said tangent location, and said groove depth for each of said grooves gradually increasing along inclined arcuate paths around the circumference thereof from said minimum depth location to said maximum depth location.

13. The box of claim 12 wherein said grooves surround inner, outer and intermediate knockouts, each of said knockouts having a plane outer surface and an outer periphery, a slot in said outer surface of each of said knockouts adjacent said outer periphery thereof generally opposite from said tangent location, and said slots having a depth that is not greater than one-half the thickness of said one wall.

14. The box of claim 13 wherein said maximum depth is the same for all of said grooves.

15. The box of claim 12 wherein the difference between said minimum and maximum depths is 0.005-0.010 inch.

16. The box of claim 12 including at least one area of increased weakness in said wall within said inner groove at a location spaced from said tangent location, the area of increased weakness providing little or no strength or resistance against removal of the inner knockout compared to the strength and resistance of the wall around the remainder of the bottom of the inner groove.

17. The box of claim 16 including at least one area of increased weakness in said wall within said intermediate groove at a location spaced from said tangent location, the area of increased weakness within the intermediate groove providing little or no strength or resistance against removal of the intermediate knockout compared to the strength and resistance of the wall around the remainder of the bottom of the intermediate groove.

18. The box of claim 17 wherein said gradually increasing depth of said intermediate groove is interrupted by at least one area of weakness within said intermediate groove located generally opposite from said tangent location and said gradually increasing depth of said inner groove is interrupted by at least two generally opposite areas of weakness spaced from both said tangent location and said location of maximum depth.

19. An electrical outlet box of plastic material, said box having a plurality of walls, at least one of said walls having at least one knockout arrangement therein formed by at least one generally circular groove in said one wall, said groove extending over a full 360 degrees and having a groove bottom, said groove having a predetermined groove depth and said groove bottom being interrupted by at least one area of weakness in said wall within said groove that increases the groove depth and further reduces the strength of said wall in the area of said groove compared to the strength of said wall around the remainder of said groove, the area of weakness occupying not more than 25% of the groove circumference and providing little or no strength and resistance against removal of the knockout compared to the strength and resistance of the wall around the remainder of the bottom of the groove.

20. The box of claim 19 wherein said box wall is severed in said area of weakness.

21. The box of claim 19 wherein there are a plurality of circumferentially-spaced areas of weakness in said wall within said groove.

22. The box of claim 19 wherein said area of weakness occupies not more than 15% of the groove circumference.

23. The box of claim 19 wherein there are at least two knockouts defining inner and outer knockouts formed by small and large diameter generally circular grooves and with said large diameter groove surrounding said small diameter groove, said one box wall having areas of weakness therein within both of said small and large diameter grooves, and said area of weakness in said one box wall occupying a larger percentage of the circumference of said small diameter groove than the percentage of the circumference of said large diameter groove that is occupied by said area of weakness in said wall within said large diameter groove.

24. The box of claim 23 wherein said area of weakness in said one box wall within said small diameter groove comprises a plurality of circumferenfially-spaced areas of weakness.

25. The box of claim 23 wherein said area of weakness in said box wall within said large diameter groove occupies not more than 15% of the circumference of said large diameter groove and said area of weakness in said box wall within said small diameter groove occupies not more than 25% of the circumference of said small diameter groove.

26. A flat plastic wall having inner and outer surfaces, a generally circular groove extending into said wall from said outer surface thereof and circumscribing a knockout having a knockout outer surface, said groove varying in depth from a minimum depth location to a maximum depth location that is generally opposite from said minimum depth location, said groove gradually varying in depth in both circumferential directions from said minimum depth location to said maximum depth location, and a recess in said knockout outer surface closely adjacent said groove at said maximum groove depth location for receiving a tool tip to apply force to said knockout and sever same from said wall.

27. A wall having at least one knockout arrangement therein, said knockout arrangement comprising eccentrically positioned inner, outer and intermediate knockouts bounded by inner, outer and intermediate circular grooves in said wall, said grooves overlying one another at a tangent location, said grooves having a common first depth at said tangent location and a second depth that is different from said first depth at a location generally opposite from said tangent location, the thickness of the wall being reduced by the grooves including along said tangent location, and the depth of all of said grooves gradually increasing along inclined arcuate paths around the circumference thereof from one of said locations to the other of said locations.

28. The wall of claim 27 wherein all of said grooves have generally the same maximum and minimum depth.

29. The wall of claim 28 wherein said minimum depth is at said tangent location and said maximum depth is generally opposite from said tangent location.

30. A wall having at least one knockout arrangement therein;
    said knockout arrangement comprising eccentrically positioned inner, outer and intermediate knockouts bounded by inner, outer and intermediate circular grooves in said wall;
    said grooves overlying one another at a tangent location;
    said grooves having a common first depth at said tangent location and a second depth that is greater than said first depth at a location generally opposite from said tangent location; and
    the depth of all of said grooves gradually increasing along inclined arcuate paths around the circumference thereof from said tangent location to said generally opposite location.

31. A wall having at least one generally circular groove therein forming a knockout;
    said groove having a depth that varies from a minimum depth at a minimum depth location to a maximum depth at a maximum depth location that is generally opposite from said minimum depth location;
    said groove depth gradually increasing along inclined arcuate paths around the circumference thereof from said minimum depth location to said maximum depth location;
    said knockout having a plane outer surface and an outer periphery; and,
    a slot in said outer surface adjacent said outer periphery generally opposite from said minimum depth location for receiving a tip of a flat bladed screwdriver.

32. The wall of claim 31 wherein said slot is a shallow depression having a curved bottom.

33. A wall having at least one generally circular groove therein forming a knockout;
    said groove having a depth that varies from a minimum depth at a minimum depth location to a maximum depth at a maximum depth location that is generally opposite from said minimum depth location;
    said groove depth gradually increasing along inclined arcuate paths around the circumference thereof from said minimum depth location to said maximum depth location;
    said gradually increasing groove depth being interrupted by at least one area of weakness in said wall within said groove spaced from said minimum depth location to further reduce the strength of said wall in the area of said groove; the area of weakness being weaker than the wall at the maximum groove depth and providing little or no strength or resistance against removal of the knockout compared to the strength and resistance of the wall around the remainder of the bottom of the groove; and,
    the area of weakness occupying not more than 25% of the circumference of the groove.

34. The wall of claim 33 wherein said area of weakness is located generally opposite from said minimum depth location.

35. The wall of claim 33 wherein said gradually increasing groove depth is interrupted by at least two generally opposite areas of weakness in said wall within said groove located intermediate said minimum and maximum depth locations, the areas of weakness being weaker than the wall at the maximum groove depth and providing little or no strength or resistance against removal of the knockout compared to the strength and resistance of the wall around the remainder of the bottom of the groove.

* * * * *

UNITED STATES PATENT AND TRADEMARK OFFICE
CERTIFICATE OF CORRECTION

PATENT NO. : 7,353,961 B2
APPLICATION NO. : 10/680798
DATED : April 8, 2008
INVENTOR(S) : Hull et al.

It is certified that error appears in the above-identified patent and that said Letters Patent is hereby corrected as shown below:

In Column 4, line 65, delete "wail" and insert -- wall --.

In Column 6, line 10, delete "wail" and insert -- wall --.

In Column 7, line 3, delete "circumferenfially-sapced" and insert -- circumferentially-spaced --.

Signed and Sealed this

Eighth Day of July, 2008

JON W. DUDAS
*Director of the United States Patent and Trademark Office*